United States Patent [19]
Miller

[11] 3,839,331

[45] Oct. 1, 1974

[54] TRIMERIZATION OF AROMATIC NITRILES

[75] Inventor: Gordon H. Miller, Richmond, Va.

[73] Assignee: Texaco Inc., New York, N.Y.

[22] Filed: Sept. 1, 1971

[21] Appl. No.: 177,127

[52] U.S. Cl............................................ 260/248 CS
[51] Int. Cl............................................. C07d 55/50
[58] Field of Search................... 260/248 CS, 78.4 N

[56] References Cited
UNITED STATES PATENTS
3,060,179   10/1962   Toland................................ 260/248
3,609,128   9/1971   Johns................................. 260/78.4

FOREIGN PATENTS OR APPLICATIONS
653,468   5/1951   Great Britain..................... 260/78.4

Primary Examiner—John M. Ford
Attorney, Agent, or Firm—T. H. Whaley; C. G. Ries

[57] ABSTRACT

Aromatic nitriles as exemplified by terephthalonitrile, isophthalonitrile, benzonitrile, etc., are trimerized to 1,3,5-triazines by contacting the respective nitriles with a molten catalyst such as zinc chloride.

27 Claims, No Drawings

TRIMERIZATION OF AROMATIC NITRILES

BACKGROUND OF THE INVENTION

1. Field of the Invention

This invention relates to a method for preparing 1,3,5-triazines in high yield by trimerization of aromatic nitriles. More particularly, this invention relates to a method for preparing 1,3,5-triazines by contacting an aromatic nitrile with a molten catalyst, such as zinc chloride.

2. Description of the Prior Art

The preparation of 1,3,5-triazines from aromatic nitriles, such as benzonitrile, etc has been described in the literature. Trimerization of aromatic nitriles, for example, can be carried out catalytically or by employing heat alone or heat and pressure. A wide variety of catalysts are known including hydrides and amides of the alkali metals and alkaline earth metals, sulfuric acid, zinc diethyl, bromine, metallic sodium, zinc chloride, aluminum chloride, titanium tetrachloride, antimony trichloride, nickel chloride, copper (I) chloride, beryllium chloride, bismuth oxychloride, manganese chloride, cobalt chloride, manganese bromide, cobalt bromide, copper acetate, manganese acetate, vanadyl chloride, et. A number of other catalysts are described by Toland in U.S. Pat. No. 3,060,179, by Johns in U.S. Pat. No. 3,502,579 and by Karguin et al in U.S. Pat. No. 3,164,555.

All of the methods known in the art for the preparation of 1,3,5-triazines by trimerization of the corresponding aromatic nitriles suffer from a number of disadvantages. For example, the previously proposed processes give only moderately satisfactory yields over lengthy reaction times, they are tedious to operate, etc.

One of the primary objects of this invention is to provide a method in which high yields of the desired 1,3,5-triazine can be achieved in a reasonable time.

Another object of this invention is to provide a process which utilizes a low cost catalyst.

Another object of this invention is to provide a process employing a catalyst which can be easily removed from the trimer product.

Another object of this invention is to provide a process in which the triazine product can be conveniently recovered from the reaction mixture.

BRIEF DESCRIPTION OF THE INVENTION

In its broadest aspect, this invention relates to a method for the preparation of 1,3,5-triazines by contacting an aromatic nitrile with molten catalyst, such as zinc chloride.

DETAILED DESCRIPTION OF THE INVENTION

The method of this invention is applicable to the conversion of a wide variety of aromatic nitriles, including mononitriles, dinitriles and other polynitriles, to form aromatic substituted triazines.

Nitriles useful as starting materials in the process of this invention include, for example, compounds of the formula:

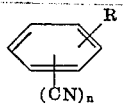

(I)

where R is selected from the group consisting of hydrogen, alkyl of from one to 10 inclusive carbon atoms as exemplified by methyl, ethyl, propyl, pentyl, heptyl, octyl and isomers thereof, amino, nitro, hydroxyl, carboxyl and halogen selected from the group consisting of chlorine, fluorine, iodine and bromine, and $n$ is an integer of from 1 to 4 inclusive.

Among the nitriles which are suitable as starting materials in the method of this invention are benzonitrile, 2-toluonitrile, 3-toluonitrile, 4-toluonitrile, 3-ethylbenzonitrile, 4-t-butylbenzonitrile, 4-aminobenzonitrile, 3-aminobenzonitrile, 3-hydroxybenzonitrile, 3-nitrobenzonitrile, 4-ethyl-2-nitrobenzonitrile, 2-hydroxy-3-propylbenzonitrile, 3-phenylbenzonitrile, 2,4-dimethylbenzonitrile, 2,6-diethylbenzonitrile, 3-chlorobenzonitrile, 4-bromobenzonitrile, 3-fluorobenzonitrile, 1-naphthonitrile, 2-naphthonitrile, 3-naphthonitrile, 3-methyl-1-naphthonitrile, 3-chloro-1-naphthonitrile, 4-nitro-1-naphthonitrile, 2-hydroxy-1-naphthonitrile, 4-hydroxy-2-methyl-1-naphthonitrile, 4-fluoro-2-naphthonitrile, orthophthalonitrile, isophthalonitrile, terephthalonitrile, 3-methyl-1,4-dicyanobenzene, 5-isopropyl-1,3-dicyanobenzene, 2,5-dimethyl-1,4-dicyanobenzene, 2-chloro-1,3-dicyanobenzene, 5-bromo-1,4-dicyanobenzene, 5-amino-1,3-dicyanobenzene, 3-nitro-1-2-dicyanobenzene, 4-hydroxy-1,3-dicyanobenzene, 2-(dichloromethyl)-1,3-dicyanobenzene, 5-(chloromethyl)-1,4-dicyanobenzene, 2-ethyl-3-chloro-1,4-dicyanobenzene, 3-nitro-1,2-dicyanobenzene, 1,3,5-tricyanobenzene, 2-chloro-1,3,5-tricyanobenzene, 3-fluoro-1,4,5-tricyanobenzene, 6-nitro-1,3,5-tricyanobenzene, 2-hydroxy-3,4,5-tricyanobenzene, 4-methyl-1,3,5-tricyanobenzene, 1,2,4,5-tetracyanobenzene, 3-hydroxy-1,2,4,5-tetracyanobenzene, 2-bromo-1,3,4,5-tetracyanobenzene, 3-nitro-1,2,4,5-tetracyanobenzene, 2-isopropyl-1,3,4,5-tetracyanobenzene and 3-n-pentyl-1,2,4,5-tetracyanobenzene.

Mixtures of aromatic nitriles, such as a mixture of about 66 percent by weight of isophthalonitrile (i.e., 1,3-dicyanobenzene) and about 34 percent by weight of terephthalonitrile (i.e., 1,4-dicyanobenzene) can also be used, if desired. An especially suitable group of starting materials includes nitriles of formula (I) above where $n$ is an integer of from 1 to 2 inclusive. Examples of materials in this last-mentioned category are isophthalonitrile and terephthalonitrile. In addition to the examples shown above, other substituted nitriles can be employed, for example, those containing groups derived from a carboxyl group, such as carboxylic salts, amides and esters, as well as sulfone and sulfonic acid groups. In this specification the term nitrile is used to refer to compounds having one or more cyano groups attached to the carbon atoms of the aromatic ring.

Catalysts which are suitable for use in the process of this invention include cuprous chloride, cupric chloride, stannous chloride, zinc chloride and mixtures thereof.

In this method the temperature of the catalysts can be varied over a wide range provided the catalyst is in the molten state. Generally the temperature employed will range from the melting point of the catalyst selected up to about 550° C and, preferably, the temperature will be from about 290° to about 450° C.

Although usually the trimerization reaction of this invention takes place almost instantaneously, the reaction time may vary from about 0.01 minute up to about 0.5 hour and, preferably, will be from about 0.01 minute to about 10 minutes, depending upon the nature of the specific nitrile and the reaction conditions employed, i.e., temperature of catalyst, type of agitation employed, etc. In the method of this invention preferably the nitrile being trimerized is heated to a temperature above its melting point and is introduced into the reaction in the molten or liquid state or as a vapor.

The resulting 1,3,5-triazine product can be conveniently recovered from the reaction mixture by a variety of methods such as by subliming the pure trimer from the molten catalyst bed. Alternatively, the catalyst in the case of zinc chloride, can be removed from the crude product by a water wash leaving behind the trimer product.

The trimer products of this invention prepared from polynitriles (i.e., those nitriles having two or more cyano groups) can be polymerized further in the presence of suitable catalysts, such as titanium tetrachloride, zinc chloride, boron trichloride, etc., at temperatures of about 450° to about 550° C to form B-stage or partially polymerized polymers which can then be molded and completely cured under a pressure of about 2,000 psi at 450° C for 4 hours to form thermoset, high temperature resistant polymeric products useful in a wide variety of high temperature applications, as more completely described in Miller application entitled Polymerization of Aromatic Nitriles (Docket No. 72,225), filed even date herewith and which is incorporated herein in its entirety. The completely cured compositions can be machined to produce a wide variety of parts such as housings, liners, or impellars for pumps useful for handling a number of organic liquids, such as alcohols, ketones, ethers, amines, etc. When compounded with glass fibers, asbestos, etc., the B-stage resins can be employed in preparing solvent-resistant pipe suitable for carrying methyl alcohol, ethyl alcohol, acetone, corrosive gases, such as chlorine, etc. 1,3,5-Triazines prepared from aromatic nitriles, such as benzonitriles, etc., are useful for producing heat-resistant semiconductor materials, as described by Karguin et al. in U.S. Pat. No. 3,164,555.

Generally, the trimerization reaction of this invention is conducted in the absence of air or in the presence of an inert gas such as nitrogen, argon, helium, etc. If desired, the method may be carried out under pressure which can range from about atmospheric up to about 500 psi or more. Preferably, the reaction mixture is agitated either by a mechanical stirrer or agitator, a platform rocker, or by blowing a heated inert gas through the reaction mass.

The trimerization method of this invention can be conducted under such conditions that the molten catalyst bed is maintained in the reactor in a highly agitated state. Aromatic nitriles heated to a temperature above their melting points are introduced into the highly agitated bed either as a separate stream through a sparger, a distribution plate, etc. or are introduced into the bed with the heated inert gas which can be nitrogen, argon, helium, etc., or mixtures of these gases. Preferably, the agitated bed reactor is operated at a pressure of from about atmospheric to about 500 psi and at a temperature of about 290° to about 550° C or more. The inert gas leaving the reactor which carries with it the trimer product, some unreacted nitrile feed and entrained catalyst is sent to a product recovery unit. Inert gas from this unit is recycled to the reactor along with the catalyst and aromatic nitrile afterwards separated from the trimer product. Separation of the pure 1,3,5-triazine product from the crude product can be accomplished by the methods previously described, such as by subliming the trimer from the crude product mixture or by fractional condensation of the vapor stream leaving the reactor.

Conducting the trimerization reaction of this invention as a continuous operating employing an agitated bed affords a number of advantages such as high production per reactor unit, fast reaction time, a convenient method of product removal from the reaction zone, uniformity of product, etc.

The triazine product prepared from isophthalonitrile, for example, by the method of this invention has the formula:

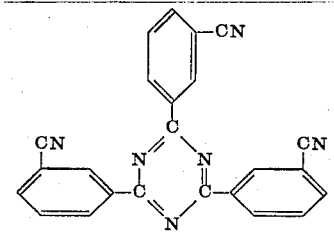

The following examples illustrate various embodiments of this invention and are to be considered not limitative.

EXAMPLE I

In this example the apparatus employed consisted of a three-necked 100 ml. flask fitted with a dropping funnel wound with an electrical heating tape, an air condenser having a drying tube at the top, a thermometer and a magnetic stirrer. A total of 41.4 g. of $ZnCl_2$ was charged to the flask which was heated by means of an oil bath. At an oil temperature of 353° C the zinc chloride was a viscous, buttery, molten mass and at an oil bath temperature of 360° C molten 1,3-dicyanobenzene (i.e., isophthalonitrile) in the amount of 5.0 g. was pressured into the reactor from the funnel under a slight positive nitrogen pressure. On contact with the molten catalyst boiling of 1,3-dicyanobenzene occurred immediately and some condensation of vapors took place on the flask walls and in the condenser. This material which was refluxed by melting it off the apparatus surfaces with a heat gun, dropped back onto the molten zinc chloride.

After a reaction time of 25 minutes, the flask assembly was raised out of the hot oil bath and, on cooling in air, the contents solidified. Water was added and the contents of the flask, after being broken into lumps, together with the washings were transferred to a beaker. The mixture was heated and poured through a weighed glass filter. The trimer, which was retained on the filter, was washed three times (80 ml. each) with boiling water in order to dissolve out all of the zinc chloride. Residue remaining on the filter (3.4809 g.) was analyzed by infrared and found to be pure trimer (i.e., 2,4,6,tris(3-cyanophenyl)-1,3,5-triazine). The yield of trimer, based on the amount of 1,3-dicyanobenzene consumed, was 100 percent.

EXAMPLE II

A total of 2,000 grams of molten zinc chloride in a stainless steel reactor vessel is brought to a highly agitated state by introducing nitrogen gas heated to a temperature of about 420° C into the lower portion of the molten bed through a perforated stainless steel plate. 1,3-Dicanyobenzene feed vaporized and heated to a temperature of about 350° C is introduced into the entering nitrogen stream at the rate of 6g/minute for a period of 2 hours. The flow of nitrogen is maintained at such a temperature and rate that a high degree of agitation of the catalyst bed is maintained and so that the bed temperature is about 410° C. The product stream which is taken off overhead from the reactor is passed to a cyclone separator and nitrogen recovered overhead is recycled to the reactor. A liquid crude trimer product is removed from the bottom of the cyclone separator at a temperature of about 390° C. Recovery of the 2,4,6tris(3-cyanophenyl)-1,3,5 triazine product is accomplished by allowing the molten crude product to flow onto a revolving chill drum from which the solidified trimer is removed as flake by a scraper and finally treated with acetone to remove unreacted nitrile and any entrained catalyst. Yield of the 2,4,6-tris(3-cyanophenyl)-1,3,5-triazine product is about 88 percent based on the 1,3-dicyanobenzene consumed.

What is claimed is:

1. A method for preparing a 1,3,5-triazine from an aromatic nitrile which comprises contacting the nitrile with a molten catalyst selected from the group consisting of cuprous chloride, cupric chloride, stannous chloride and mixtures thereof and recovering the triazine product from the reaction mixture.

2. The method of claim 1 wherein the aromatic nitrile is contacted with the said molten catalyst at a temperature of about 290° to about 550° C.

3. The method of claim 1 wherein the said aromatic nitrile is contacted with the said molten catalyst at a temperature of about 290° to about 450° C.

4. The method of claim 1 wherein the said molten catalyst is cuprous chloride.

5. The method of claim 1 wherein the said aromatic nitrile is heated to a temperature above its melting point prior to contacting the molten catalyst.

6. The method of claim 1 wherein the said aromatic nitrile has the formula:

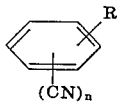

wherein R is selected from the group consisting of hydrogen alkyl of from one to 10 inclusive carbon atoms, amino, nitro, hydroxy, carboxyl, and halogen, and n is an integer of from 1 to 4 inclusive.

7. The method of claim 1 wherein the said aromatic nitrile has the formula:

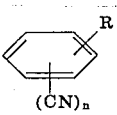

wherein R is selected from the group consisting of hydrogen, alkyl of from one to 10 inclusive carbon atoms, amino, nitro, hydroxyl carboxyl, and halogen, and n is an integer of from 1 to 2 inclusive.

8. The method according to claim 1 wherein the said aromatic nitrile is isophthalonitrile.

9. The method according to claim 1 wherein the said aromatic nitrile is terephthalonitrile.

10. The method according to claim 1 wherein the said aromatic nitrile is a mixture comprising about 66 percent by weight of isophthalonitrile and about 34 percent by weight of terephthalonitrile.

11. A method for preparing 2,4,6-tris (3-cyanophenyl)-1,3,5-triazine which comprises contacting isophthalonitrile with molten cuprous chloride and recovering the triazine product from the reaction mixture.

12. A method for preparing 2,4,6-tris (4-cyanophenyl)-1,3,5-triazine which comprises contacting terephthalonitrile with molten cupric chloride and recovering the triazine product from the reaction mixture.

13. A method for preparing a 1,3,5-triazine from an aromatic nitrile which comprises:
   a. forming a highly agitated bed of a molten catalyst selected from the group consisting of cuprous chloride, cupric chloride, stannous chloride, zinc chloride, and mixtures thereof,
   b. introducing into the said bed an aromatic nitrile,
   c. withdrawing from said bed a reaction mixture containing the triazine product, and
   d. recovering the triazine product from the said reaction mixture.

14. The method of claim 13 wherein the said highly agitated bed is formed by passing an inert gas through a bed of the molten catalyst.

15. The method of claim 14 wherein the said inert gas is selected from the group consisting of nitrogen, argon, helium, and mixtures thereof.

16. The method of claim 13 wherein the temperature of the highly agitated bed is maintained between about 290° and about 550° C.

17. The method of claim 1 wherein the said aromatic nitrile heated to a temperature above its melting point is introduced into the high agitated bed in the inert gas stream.

18. The method of claim 13 wherein the said aromatic nitrile has the formula:

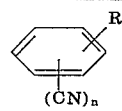

wherein R is selected from the group consisting of hydrogen, alkyl of from one to 10 inclusive carbon atoms, amino, nitro, hydroxy, carboxyl, and halogen, and n is an integer of from 1 to 4 inclusive.

19. The method of claim 13 wherein the said aromatic nitrile has the formula

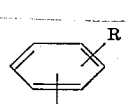

wherein R is selected from the group consisting of hydrogen alkyl of from one to 10 inclusive carbon atoms, amino, nitro, hydroxyl, carboxyl, and halogen, and $n$ is an integer of from 1 to 2 inclusive.

20. The method of claim 13 wherein the said aromatic nitrile is selected from the group consisting of isophthalonitrile and terephthalonitrile.

21. The method of claim 13 wherein the said aromatic nitrile is isophthalonitrile.

22. The method of claim 13 wherein the said aromatic nitrile is terephthalonitrile.

23. The method for preparing a 1,3,5-triazine which comprises passing a nitrogen stream through a bed of molten cuprous chloride to form a highly agitated bed maintained at a temperature of about 290° to about 550° C, introducing isophthalonitrile into the bed in the said nitrogen stream, withdrawing from the said bed a reaction mixture containing the formed 2,4,6-tris(3-cyanophenyl)-1,3,5-triazine product and recovering the said triazine from the reaction mixture.

24. The method of claim 1 wherein the said molten catalyst is cupric chloride.

25. The method of claim 1 wherein the said molten catalyst is stannous chloride.

26. The method of claim 13 wherein the said catalyst is cupric chloride.

27. The method of claim 13 wherein the said catalyst is stannous chloride.

* * * * *